(12) United States Patent
Drew et al.

(10) Patent No.: US 8,478,620 B2
(45) Date of Patent: Jul. 2, 2013

(54) PROFIT COMPARISON OF EXTENDED WARRANTIES

(75) Inventors: Julie Ward Drew, Redwood City, CA (US); Filippo Balestrieri, Mountain View, CA (US); Ruxian Wang, New York, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 193 days.

(21) Appl. No.: 13/027,942

(22) Filed: Feb. 15, 2011

(65) Prior Publication Data

US 2012/0209643 A1 Aug. 16, 2012

(51) Int. Cl.
*G06Q 10/00* (2012.01)

(52) U.S. Cl.
USPC .......................................... 705/7.11; 705/302

(58) Field of Classification Search
USPC .................................. 705/7.11, 302
See application file for complete search history.

(56) References Cited

U.S. PATENT DOCUMENTS

| | | | |
|---|---|---|---|
| 7,904,319 B1* | 3/2011 | Whear et al. | 705/4 |
| 8,275,642 B2* | 9/2012 | Chan et al. | 705/7.11 |
| 2004/0046033 A1* | 3/2004 | Kolodziej et al. | 235/487 |
| 2006/0069581 A1 | 3/2006 | Chien et al. | |
| 2010/0185503 A1* | 7/2010 | Drew et al. | 705/14.11 |

OTHER PUBLICATIONS

Hartman, et al. "Designing and Pricing Menus of Extended Warranty Contracts", Naval Research Logistics, vol. 56 (2009).*
Yeo, et al. "Optimal Inventory Policy for Products With Warranty Agreements" IEEE 2007, pp. 1838-1843.*
U Dinesh Kumar and Gopinath Chattopadhyay, "Mathematical Models for Analysis of Extended Warranty" in Proceedings of the Fifth Asia Pacific Industrial Engineering and Management Systems Conference 2004.*

Jack, et al., "A Flexible Extended Warranty and Related Optimal Strategies", Journal of The Operational Research Society, Published: Nov. 22, 2006, vol. 58, Palgrave Macmillan Ltd., Basingstoke, pp. 1612-1620.
Hartman, et al., "Designing and Pricing Menus of Extended Warranty Contracts", Naval Research Logistics, vol. 56, Issue 3 pp. 199-214 (2009).
Wu, Shaomin., "Warranty Claim Analysis Considering Human Factors", Cranfield University, School of Applied Sciences, Reliability Engineering and System Safety, vol. 96, Issue 1, Jan. 2011, 22 pages.
Kumar, et al., "Mathematical Models for Analysis of Extended Warranty", Department of Mechanical, Manufacturing and Medical Engineering, Proceedings of the Fifth Asia Pacific Industrial Engineering and Management Systems Conference 2004, 7 pages.
Chattopadhyay, et al. "Development of Lifetime Warranty Policies and Models for Estimating Costs", School of Engineering Systems, Queensland University of Technology, Reliability Engineering and System Safety, Published: Mar. 7, 2007, pp. 522-529.
Ward Drew, et al., "Flexible Extended Product Warranties", U.S. Appl. No. 12/789,240, filed May 27, 2010, 40 pages.
Ward Drew, et al., "Flexible Extended Product Warranties Having Partially Refundable Premiums", U.S. Appl. No. 12/789,314, filed May 27, 2010, 42 pages.

* cited by examiner

*Primary Examiner* — Mark A Fleischer

(57) ABSTRACT

Systems, methods, and machine-readable and executable instructions are provided for profit comparison. Profit comparison can include determining a first profitability function of a flexible duration extended warranty offering with respect to a first plurality of warranty parameters and determining a second profitability function of a fixed duration extended warranty offering with respect to a second plurality of warranty parameters. Profit comparison can also include comparing the first function and the second function for at least one level of at least one of profit lift and flexible duration warranty offering coverage duration. Presenting results of the comparison for a range of values of the first and second plurality of warranty parameters can also be included in profit comparison.

15 Claims, 7 Drawing Sheets

|   | A | B | C | D | E | F | G | H | I | J | K | L |
|---|---|---|---|---|---|---|---|---|---|---|---|---|
| 1 | PROBABILITY OF FAILURE IN A YEAR f | 10% | | | | | | | | | | |
| 2 | AVERAGE REPAIR COST C | $ 200.00 | | | | | | | | | | |
| 3 | MONTH IN WHICH FAILURE HAPPENS k | 1 | | | | | | | | | | |
| 4 | 1 YEAR EXTENDED WARRANTY PRICE $P_t$ | $ 60.00 | | | | | | | | | | |
| 5 | | | | | | | | | | | | |
| 6 | | | MATRIX CONTAINS COVERAGE DURATION D REQUIRED TO ACHIEVE PROFIT EQUIVALENCE | | | | | | | | | |
| 7 | | | DEMAND LIFT FROM MONTHLY SERVICE $(d_m - d_t)/d_t$ | | | | | | | | | |
| 8 | PRICE RATIO $P_t/P_m$ | | 0% | 20% | 40% | 60% | 80% | 100% | 120% | 140% | 160% | 180% | 200% |
| 15 | | 8 | 8.8 | 7.8 | 7.1 | 6.6 | 6.1 | 5.8 | 5.5 | 5.3 | 5.2 | 5.0 | 4.8 |
| 17 | | 9 | 9.9 | 8.8 | 8.0 | 7.4 | 6.9 | 6.6 | 6.0 | 5.8 | 5.6 | 5.4 | 5.3 |
| 18 | | 10 | 11.0 | 9.8 | 8.9 | 8.2 | 7.7 | 7.3 | 7.0 | 6.7 | 6.4 | 6.2 | 6.1 |
| 19 | | 11 | 12.1 | 10.8 | 9.3 | 9.1 | 8.5 | 8.0 | 7.7 | 7.4 | 7.1 | 6.9 | 6.7 |
| 20 | | 12 | 13.2 | 11.7 | 10.7 | 9.9 | 9.3 | 8.8 | 8.4 | 8.0 | 7.8 | 7.5 | 7.3 |
| 21 | | 13 | 14.3 | 12.7 | 11.6 | 10.7 | 9.9 | 9.3 | 8.8 | 8.4 | 8.0 | 7.8 | 7.5 |

FIG. 2

| | A | B | C | D | E | F | G | H | I | J | K | L |
|---|---|---|---|---|---|---|---|---|---|---|---|---|
| 1 | PROVIDER'S COST FOR 1 YEAR EXTENDED WARRANTY $C_t$ | $ 24 | | | | | | | | | | |
| 2 | PROVIDER'S COST FOR 1 MONTH EXTENDED WARRANTY $C_m$ | $ 2 | | | | | | | | | | |
| 3 | 1 YEAR EXTENDED WARRANTY PRICE $P_t$ | $ 60 | | | | | | | | | | |
| 4 | AVG DURATION(MONTHS) PURCHASED FOR MONTHLY EXTENDED WARRANTY D | 9 | | | | | | | | | | |
| 5 | | | | | | | | | | | | |
| 6 | | | | MATRIX CONTAINS PROFIT LIFT OF MONTHLY VS. TRADITIONAL $(\pi_m - \pi_t)/\pi_t$ | | | | | | | | |
| 7 | | | | DEMAND LIFT FROM MONTHLY SERVICE $(d_m - d_t)/d_t$ | | | | | | | | |
| 8 | PRICE RATIO $P_t/P_m$ | | 0% | 20% | 40% | 60% | 80% | 100% | 120% | 140% | 160% | 180% | 200% |
| 15 | | 8 | 38% | 17% | 40% | 63% | 148% | 175% | 203% | 230% | 158% | 285% | 313% |
| 17 | | 9 | 17% | 40% | 63% | 87% | 110% | 133% | 157% | 180% | 203% | 227% | 250% |
| 18 | | 10 | 0% | 20% | 40% | 60% | 80% | 100% | 120% | 140% | 160% | 180% | 200% |
| 19 | | 11 | -14% | 4% | 21% | 38% | 55% | 73% | 90% | 107% | 125% | 142% | 155% |
| 20 | | 12 | -25% | -10% | 5% | 20% | 35% | 50% | 65% | 80% | 95% | 110% | 125% |
| 21 | | 13 | -35% | -22% | -8% | 5% | 13% | 31% | 41% | 57% | 70% | 83% | 96% |

FIG. 5

| | | | | | 632 630 616 650 | | | | | | | | |
|---|---|---|---|---|---|---|---|---|---|---|---|---|---|
| PROVIDER'S COST FOR 1 YEAR EXTENDED WARRANTY $C_t$ | $ 24.00 | | | | | | | | | | | | |
| PROVIDER'S COST FOR 1 MONTH EXTENDED WARRANTY $C_m$ | $ 2.00 | | | | | | | | | | | | |
| 1 YEAR EXTENDED WARRANTY PRICE $P_t$ | $ 60.00 | | | | | | | | | | | | |
| DESIRED PROFIT LIFT x | 0% | | | | | | | | | | | | |
| | | MATRIX CONTAINS COVERAGE DURATION D* (FOR ALL MONTHLY CUSTOMERS) REQUIRED TO ACHIEVE PROFIT LIFT x DEMAND LIFT FROM MONTHLY SERVICE $(d_m - d_t)/d_t$ | | | | | | | | | | | |
| PRICE RATIO $P_t/P_m$ | | 0% | 20% | 40% | 60% | 80% | 100% | 120% | 140% | 160% | 180% | 200% |
| | 8 | 6.5 | 5.5 | 4.7 | 4.1 | 3.6 | 3.3 | 3.0 | 2.7 | 2.5 | 2.3 | 2.2 |
| | 9 | 7.7 | 6.4 | 5.5 | 4.8 | 4.3 | 3.9 | 3.5 | 3.2 | 3.0 | 2.8 | 2.6 |
| | 10 | 9.0 | 7.5 | 6.4 | 5.6 | 5.0 | 4.5 | 4.1 | 3.8 | 3.5 | 3.2 | 3.0 |
| | 11 | 10.4 | 8.7 | 7.4 | 6.5 | 5.8 | 5.2 | 4.7 | 4.3 | 4.0 | 3.7 | 3.5 |
| | 12 | 12.0 | 10.0 | 8.6 | 7.5 | 6.7 | 6.0 | 5.5 | 5.0 | 4.6 | 4.3 | 4.0 |
| | 13 | 13.8 | 11.5 | 9.8 | 8.6 | 7.6 | 6.9 | 6.3 | 5.7 | 5.3 | 4.9 | 4.6 |

FIG. 6

PROFIT COMPARISON OF EXTENDED WARRANTIES

BACKGROUND

Extended warranties are an important business for hardware manufacturers because they can help to improve the customer experience and increase customer loyalty. Extended warranties are also a source of revenues. Extended warranties may be fixed in their fee and duration, or they may be flexible in their fee, duration, or both. Fixed duration extended warranties may require a long-term commitment, but extended warranties that offer More flexibility in coverage duration (e.g., monthly extended warranties, refundable extended warranties, etc.) may attract customers who upgrade their hardware frequently. Flexible duration extended warranties may also attract customers who are uncertain about the timing of their next hardware upgrade or who are uncertain about product reliability. Flexible duration extended warranties can also attract more budget-constrained customers depending on the premium payment schedule.

BRIEF DESCRIPTION OF THE DRAWINGS

FIG. 2 illustrates a diagram of an example of a tabular presentation for profit comparison according to the present disclosure.

FIG. 5 illustrates a diagram of an example of a tabular presentation for profit comparison according to the present disclosure.

FIG. 6 illustrates a diagram of an example of a tabular presentation for profit comparison according to the present disclosure.

DETAILED DESCRIPTION

Figure 1:
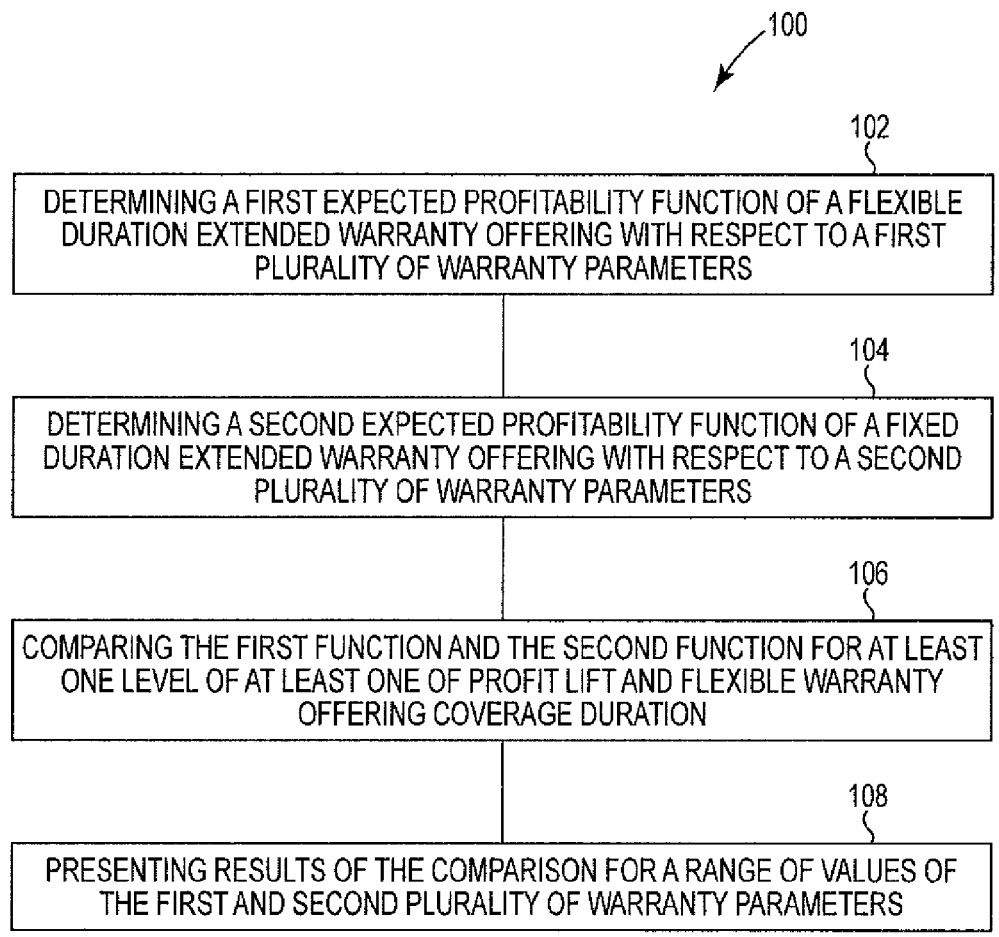
FIG. 1 is a flow chart illustrating an example of a method for profit comparison according to the present disclosure.

Examples of the present disclosure may include methods, systems, and machine-readable and executable instructions and/or logic. An example method for profit comparison may include determining a first profitability function of a flexible duration extended warranty offering with respect to a first plurality of warranty parameters and determining a second profitability function of a fixed duration extended warranty offering with respect to a second plurality of warranty parameters. An example method for profit comparison can also include comparing the first function and the second function for at least one level of at least one of profit lift and flexible duration warranty offering coverage duration. Presenting results of the comparison for a range of values of the first and second plurality of warranty parameters can also be included in an example method of profit comparison.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 320 may reference element "20" in FIG. 3, and a similar element may be referenced as 720 in FIG. 7. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

A warranty is an assurance that some product or service will be provided or will meet certain specifications. Warranties can be utilized to assist in the management of customer relationships or as a mechanism to retain customers. An extended warranty may be a contract that can be purchased to cover the repair costs of product support or repair services beyond the warranty provider's original warranty period. An extended warranty may allow the customer to receive support and product repair services above and beyond what is provided by a standard warranty associated with a product or hardware. An extended warranty may take the form of a flexible duration extended warranty or a fixed duration extended warranty.

A flexible duration extended warranty may be purchased by a customer at the time of a hardware purchase, with the option of canceling the warranty coverage at any time. A flexible duration extended warranty may also be adapted to warranties that can be purchased after the hardware purchase. This flexible duration extended warranty service may be billed up front, and the customer may receive a prorated refund if the customer cancels before the end of the warranty term. A flexible duration extended warranty service may also be billed on a periodic basis (e.g., monthly or quarterly).

A flexible duration extended warranty may increase the extended warranty attach rate, (e.g., the percentage of hardware units that are sold with an extended warranty) and may enable a warranty provider to charge a premium for the flexibility of the extended warranty. Customers may keep flexible duration extended warranty coverage for a shorter duration than fixed duration coverage (e.g., one year fixed duration extended warranty) because the customer has the freedom to cancel without penalty. In an example of customer behavior that adversely impacts a provider, customers may also cancel the flexible duration extended warranty coverage immediately after experiencing failure in the hardware. Some flexible duration extended warranties may include cancellation penalties.

A warranty provider who is considering introducing a flexible duration extended warranty may want to estimate the impact on his or her profits under a variety of scenarios. There may be uncertain factors that influence a profit impact of the flexible duration extended warranty offering relative to a fixed duration extended warranty offering. For example, the number of customers that buy the flexible duration extended warranty offering and the average duration of flexible warranty coverage that customers purchase may be unknown to the provider. The provider may want to estimate the profit impact under a variety of scenarios involving coverage duration, demand, and other factors. Specifically, a provider may want to estimate a profitability of a flexible duration extended warranty offering, in comparison to a fixed duration extended warranty offering, under the different scenarios.

For example, a provider may want to estimate the change in profit of a flexible duration extended warranty offering relative to a fixed duration warranty offering that would occur if customers of flexible duration extended warranties cancel their coverage immediately after experiencing a failure. The provider's profit impact may be affected by many factors, some of which may be uncertain or not yet determined by the provider. For example, a provider may not know how long (e.g., warranty duration) a customer will choose to keep the flexible duration extended warranty. A provider may consider the impact of warranty duration on profit because even if the demand for flexible duration extended warranties is high, a provider may choose not to offer the flexible duration extended warranty if the provider believes or estimates that average coverage duration of the flexible duration extended warranties is low.

Examples of profit impact factors may include premia the provider charges for the flexible and fixed duration extended warranties, the number of customers who buy flexible and fixed services, the average probability of failure occurring, the average repair cost, the average duration of coverage for flexible duration extended warranty customers. Other factors may include whether flexible warranty customers drop coverage after experiencing failures, and how long flexible duration warranty customers keep coverage if they do not experience a failure. By estimating profit impact under scenarios that a warranty provider may consider most likely to occur, the provider can determine whether or not it will be worthwhile to introduce flexible extended warranties. Some profit impact factors may be known to a provider, while others may be unknown.

For example, the number of customers who buy flexible duration extended warranty offerings and the average duration of coverage for flexible duration extended warranty offerings may be unknown. For example, a provider who has not yet launched a flexible duration extended warranty service may not know the number of customers who will purchase flexible duration extended warranty offerings. In another example, the demand for a fixed duration extended warranty may be known to a provider who already offers fixed duration extended warranties. A provider may know the premium for a fixed duration extended warranty, but he or she may have not yet determined the premium to charge for a flexible duration extended warranty offering.

FIG. 1 is a flow chart illustrating an example of a method 100 for profit comparison according to the present disclosure. At 102, a first expected profitability function of a flexible duration extended warranty offering with respect to a first plurality of warranty parameters is determined. The first plurality of warranty parameters can include a flexible duration warranty offering price, a flexible duration warranty offering demand, a probability of hardware failure, a month of the hardware failure, a hardware repair cost, a third party premium for the flexible duration warranty offering, an average duration of coverage for the customer who does not experience the hardware failure, and an average duration of coverage for all flexible duration warranty offering customers.

The profit comparison may include specifying a unit of measure for the duration of coverage (e.g., period). The unit can correspond to an interval of time that is indivisible with respect to the coverage decision of the customer who buys a flexible duration extended warranty. For example, if the period is a day, the duration of warranty coverage can be measured in terms of a number of days. A customer can choose to stop coverage on any given day. The hour of the day of cancellation may not be relevant, however. In an example, the timing of the payments for a daily flexible duration extended warranty may or may not happen on a daily basis. If, for example, the payments are charged upfront on a monthly basis, the customer who cancels coverage in the tenth day of the month can receive a refund that is proportional to the number of days (e.g., twenty days) of the month without coverage. In another example, a monthly warranty can be an example of a flexible duration extended warranty with one month being the unit of measure.

In an example, it can be assumed that customers who buy a flexible duration extended warranty drop their coverage immediately after a failure occurs to a product or hardware. The failure can occur in period k, with a provider's worst-case scenario of the failure occurring in the first period of the flexible duration extended warranty (e.g., k=1). Some providers may want to consider the outcome of the worst case scenario. For example, a risk averse provider may use the worst case scenario as a benchmark in making a decision on warranty offerings.

In an example, a provider may consider a number of parameters in order to estimate a profit for a flexible duration extended warranty. A parameter considered may be the probability f of failure of the hardware in one year, and it can be assumed in this example that the hardware would fail no more than once per year. Other such parameters include the average cost c to the provider per repair of a failure, the demand for a flexible duration extended warranty $d_m$, and the demand for a one year fixed duration extended warranty $d_d$. A ratio of these demands can be considered. Each demand can be the number of people who buy each type of warranty, (e.g., flexible duration or fixed duration) and these demands can be considered by the warranty provider. In an example, the price of a flexible duration extended warranty $p_m$ and the price of a fixed duration one year extended warranty $p_t$ can also be considered, as can the average duration of coverage D for flexible duration customers who have not experienced failures.

The price of a flexible duration extended warranty $p_m$ can be the price of one time unit of coverage. It may or may not correspond to the fraction of time coverage that is charged to the customer. For example, if the unit of measure for coverage duration is a month, and a customer pays upfront on for one year of coverage, then $p_m$ can be equal to the price of a flexible duration extended warranty (e.g., actually paid by the customer) divided by twelve, the number of months in a year. The customer can be charged for each time unit of coverage, and the price $p_m$ can be the price of one time unit of coverage, and the price of the flexible duration extended warranty.

The profit $\pi_m$ for a flexible duration extended warranty or a short fixed duration warranty can be determined using a function. In an example $\pi_m = d_m(f(kp_m - c) + (1-f)Dp_m)$ and can be an expected profit for a flexible duration extended warranty. In a worst-case scenario for a provider, k=1. In an example, a number of the first plurality of warranty parameters is unknown. The profit $\pi_m$ can be estimated under different scenarios on the unknown parameters. In another example, the parameters are based on historical data of a current customer, a plurality of current customers, a previous customer, or a plurality of previous customers.

At 104, a second expected profitability function of a fixed duration extended warranty offering with respect to a second plurality of warranty parameters is determined. The second plurality of warranty parameters can include a fixed duration warranty offering price, a fixed duration warranty offering demand; a probability of hardware failure, a hardware repair cost, and a third party premium for the fixed duration warranty offering.

The profit $\pi_t$ for a fixed duration one year extended warranty can be determined using a function. In an example, $\pi_t = d_t(p_t - f_c)$ and can be an expected profit for a fixed duration one year warranty. In an example, some of the second plurality of parameters are unknown. The profit $\pi_t$ can be estimated under different scenarios on the unknown parameters. In another example, the parameters are based on historical data of a current customer, a plurality of current customers, a previous customer, or a plurality of previous customers.

At 106, the first function and the second function are compared for at least one level of at least one of profit lift and flexible duration warranty offering coverage duration. For example, profit lift is the selected parameter, and the first function and the second function can be compared for at least one level of the profit lift. Continuing the example, by comparing the first and second functions, it can be determined what the average duration of coverage required is for flexible duration customers who do not experience hardware failures in order for the profit from a flexible duration extended warranty to be equal to a predetermined profit lift level over an expected profit of a fixed duration warranty offering as a function of a plurality of warranty parameters. A provider may choose profit lift coverage duration as a parameter to present. The profit lift may be expressed as a fraction or a percentage of the fixed duration extended warranty profit. For example, a provider may choose the level of 0.1, corresponding to 10 percent increase in profit, for a profit lift parameter. The functions may be compared for each of the fixed values of the parameter. In this example, the comparison comprises presenting the values of average coverage duration required for flexible duration extended warranty customers who do no experience hardware failures to achieve profit lift level 0.1 or 10 percent.

Profit lift can be a function of the first and second profitability functions such that $\pi_m = \pi_t(1+x)$, where $\pi_m$ is the first profitability function, $\pi_t$ is the second profitability function, and x is the profit lift. To find the average duration of coverage for flexible duration extended warranty customers who have not experienced failures required for achieving a profit lift level x between flexible duration extended warranties and fixed duration extended warranties, the function can be solved for D. In an example, D* is the average duration of coverage for remaining flexible duration customers to achieve a profit lift of x between flexible duration extended warranties and fixed duration extended warranties, $$D^* = \frac{\frac{d_t}{d_m}\left(\frac{p_t}{p_m} - \frac{fc}{p_m}\right)(1+x) - f\left(k - \frac{c}{p_m}\right)}{(1-f)}$$

In the example in which that the first function and the second function are compared for level profit lift 10 percent, the comparison comprises presenting values of D* with profit level x fixed to be 0.1. Other parameters of a provider's choice may also be fixed. A provider may choose to fix certain parameters over others depending on the decision he or she wants to make. The provider may then solve for or display results as a function of remaining unfixed parameters.

The expected coverage duration can also be determined for a flexible duration extended warranty customer who does not experience a hardware failure for which the expected profit of the flexible duration warranty offering equals the expected profit of the fixed duration warranty offering as a function of a plurality of warranty parameters. This is an example of the previous comparison, where a predetermined profit lift level is zero. Furthermore, an expected profit lift of the flexible duration extended warranty offering over the fixed duration warranty offering as a function of a plurality of parameters can be determined.

The plurality of parameters can include a flexible duration warranty offering price, a flexible duration warranty offering demand, a probability of hardware failure, a month of the hardware failure, a hardware repair cost, a third party premium for the flexible duration warranty offering, an average duration of coverage for the customer who does not experience the hardware failure, and an average duration of coverage for all flexible duration warranty offering customers. The plurality of parameters can also include a fixed duration warranty offering price, a fixed duration warranty offering demand; a probability of hardware failure, a hardware repair cost, and a third party premium for the fixed duration warranty offering.

The provider may also leave the profit lift unfixed, fix other parameters, and determine profit lift as a function of the remaining unfixed parameters. The provider can also look at the values for profit lift presented over the unfixed parameters and determine different scenarios that may occur. Based on the scenarios, as well as previously presented scenarios, the provider can decide whether or not to introduce different types of flexible duration warranty offerings.

At 108, the results of the comparison for a range of values of the first and second plurality of warranty parameters are presented. In an example, the results can be presented in tabular form over a number of different values of price ratio $p_t/p_m$ and a second number of different values of demand lift $(d_m - d_t)/d_t$ of a demand for the fixed duration extended warranty offering to the demand for the flexible duration extended warranty offering. For example, the results of a comparison presented may be the profit lift of the flexible duration extended warranty over the fixed duration extended warranty. In another example, the results of a comparison may be the average duration of coverage of flexible extended warranty customers who do not experience a failure. The tabular presentation for different values of price ratio and demand lift allows the provider to simultaneously consider the effects of multiple uncertain factors, such as price ratio and demand lift, on the comparison between flexible and fixed duration warranties. Because demand and price may often be related, the provider can find some combinations of price ratio and demand lift more likely to occur than others. The provider can focus on the comparison at the combinations of price ratio and demand lift that may be most likely to occur. A warranty may be provided to a customer based on the results of the comparison.

FIG. 2 illustrates a diagram 250 of an example of a tabular presentation for profit lift estimation according to the present disclosure. The diagram 250 illustrates an example implementation of the present disclosure rather than a limitation thereof, as profit comparison can be used in other implementations. FIG. 2 illustrates a diagram of an example tabular presentation of $\pi_m = \pi_t(1+x)$ when x=0. Box 210 can represent the probability f of a hardware failure in year one. Box 212 can include the average repair cost c of the failed hardware. Box 214 can include the month k in which the hardware failure occurs. In a worst-case scenario for a provider, the hardware fails in the first month (e.g., k=1). Box 216 can include the price $p_t$ of a one year extended warranty. These can be values that are determined or provided when estimating the first and second profitabilities.

Each row in the diagram 250 can correspond to a different price ratio $p_f/p_m$ assumption, and each column in diagram 250 can correspond to a different demand lift ratio $(d_m-d_f)/d_f$ assumption. The matrix in diagram 250 can contain a number of average coverage durations D*, and a warranty provider can quantify the average duration D* of coverage for flexible duration extended warranty customers not experiencing a hardware failure that results in profit equivalence between the flexible duration extended warranty and the fixed duration warranty in different scenarios. Each scenario can be defined by different assumptions in terms of price and demand lift ratio. For example, the lower the value of D*, the higher is the likelihood that selling the flexible duration extended warranty is profitable because a lower duration of coverage may be required to achieve parity in profits between flexible and fixed duration warranties.

Presenting duration D* over a range of different values of price ratio and demand lift allows the provider to simultaneously consider the effects of price ratio and demand lift on profit-equalizing duration D*. The matrix in diagram 250 can contain a number of average coverage durations D*. Because the price ratio $p_f/p_m$ and demand lift $(d_m-d_f)/d_f$ may be likely to be positively correlated, the provider may choose to focus attention on areas of the table that correspond to positive correlation when considering whether or not to offer a flexible duration extended warranting offering. This consideration can aid a warranty provider in his decision to introduce a product. For example, if D* is D*>12 months for all of the combinations of demand and price that the warranty provider considers feasible, then a flexible duration extended warranty cannot be expected to be more profitable than a fixed duration warranty with a duration of 12 months.

Figure 3:
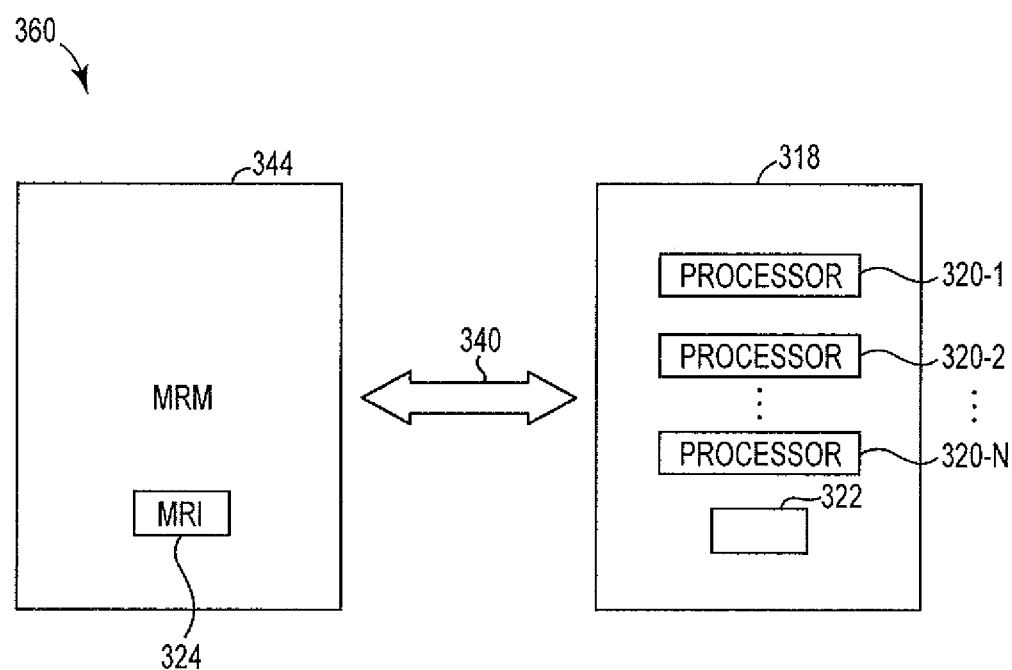
FIG. 3 illustrates a block diagram of an example of a machine-readable medium in communication with processing resources for profit comparison according to the present disclosure.

FIG. 3 illustrates a block diagram 360 of an example of a machine-readable medium (MRM) 344 in communication with a computing device 318, e.g., Java application server, having processor resources of more or fewer than 320-1, 320-2 . . . 320-N, that can be in communication with, and/or receive a tangible non-transitory machine-readable medium (MRM) 344 storing a set of machine readable instructions 324 executable by one or more of the processor resources (e.g., 320-1, 320-2 . . . 320-N) for profit comparison, as described herein. The computing device may include memory resources 322, and the processor resources 320-1, 320-2 . . . 320-N may be coupled to the memory resources 322.

Processor resources can execute machine-readable instructions 324 that are stored on an internal or external non-transitory machine-readable medium 344. A non-transitory machine-readable medium (e.g., machine-readable medium 344), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), high definition digital versatile discs (HD DVD), compact discs (CD), and/or a solid state drive (SSD), flash memory, etc., as well as other types of machine-readable media.

The non-transitory machine-readable 344 medium can be integral, or communicatively coupled, to a computing device, in either in a wired or wireless manner. For example, the non-transitory machine-readable medium can be an internal memory, a portable memory, a portable disk, or a memory located internal to another computing resource (e.g., enabling the machine-readable instructions to be downloaded over the Internet).

The MRM 344 can be in communication with the processor resources (e.g., 320-1, 320-2 . . . 320-N) via a communication path 340. The communication path 340 can be local or remote to a machine associated with the processor resources 320-1, 320-2 . . . 320-N. Examples of a local communication path 340 can include an electronic bus internal to a machine such as a computer where the MRM 344 is one of volatile, non-volatile, fixed, and/or removable storage medium in communication with the processor resources (e.g., 320-1, 320-2 . . . 320-N) via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 340 can be such that the MRM 344 is remote from the processor resources (e.g., 320-1, 320-2 . . . 320-N) such as in the example of a network connection between the MRM 344 and the processor resources (e.g., 320-1, 320-2 . . . 320-N). That is, the communication path 340 can be a network connection. Examples of such a network connection can include a local area network (LAN), a wide area network (WAN), a personal area network (PAN), and the Internet, among others. In such examples, the MRM 344 may be associated with a first computing device and the processor resources (e.g., 320-1, 320-2 . . . 320-N) may be associated with a second computing device (e.g., a Java application server).

In an example, the processor resources 320-1, 320-2 . . . 320-N coupled to the memory 322 can estimate a first profitability of a flexible duration extended warranty offering and estimate a second profitability of a fixed duration extended warranty offering. The first and second profitability estimations can also be compared. The comparison of the first and second profitabilities can be used in a determination of the profit lift of flexible duration (e.g., monthly, quarterly, etc.) extended warranties over fixed duration (e.g., one year fixed term, two year fixed term, etc.) extended warranties. The comparison can be considered without a profit equivalence condition and without considering threshold values. A warranty provider can use this comparison to support his or her decision regarding a product and warranties offered with the product. It can be assumed in this example that customers who buy a flexible duration extended warranty drop their coverage immediately after failure occurs. It can also be assumed that the failure occurs in month k, with a provider's worst case scenario being k=1 (e.g., failure occurs in the first month of the monthly flexible duration extended warranty).

In comparing estimated profits of flexible and fixed duration warranties, a provider may consider several parameters. In an example, the probability f of failure of the hardware in one year can be considered, and it can be assumed in this example that the hardware would fail no more than once per year. The conditional expected one-year support cost c to the provider from customers who experience at least one failure can also be considered. The demand for a flexible duration extended warranty $d_m$ and the demand for a fixed duration one year extended warranty $d_f$ can be considered. A ratio of these demands can be considered (e.g., $(d_m-d_f)/d_f$)). Each demand can be the number of people who buy each type of warranty (e.g., flexible duration or fixed length). These demands can be estimated by the warranty provider. However, the demand may not be known in advance. In an example, the price of a flexible duration extended warranty $p_m$ and the price of a fixed duration one year extended warranty $p_t$ can also be considered. Furthermore, the average duration of coverage D for flexible duration customers who have not experienced failures can also be considered, and this can be assumed to be at most 12 months, or a time-limit chosen by the provider.

The profit $\pi_m$ for a flexible duration or short-term fixed duration extended warranty can be determined using a function. In an example $\pi_m=d_m(f(kp_m-c)+(1-f)Dp_m)$ and can be an expected profit for a flexible duration or short-term fixed duration extended warranty. In a worst-case scenario for a provider, k=1. The profit $\pi_t$ for a fixed duration one year extended warranty can also be determined using a function. In an example, $\pi_t=d_t(p_t-f_c)$ and can be an expected profit for a fixed duration one year warranty.

By comparing the first and second profitabilities, a profit lift of a flexible duration extended warranty offering over a fixed duration extended warranty can be determined. This can be determined for an average duration D, demand lifts of flexible duration extended warranties versus fixed duration extended warranties, and price relationships between flexible duration extended warranties and fixed duration extended warranties. A warranty provider can adjust input values (e.g., average duration, etc.) to allow for consideration of different profit lift scenarios.

A profit lift from a flexible duration to a fixed duration as a fraction of fixed duration profit can be determined using a function. For example, $$\frac{d_m(f(kp_m-c)+(1-f)Dp_m)-d_t(p_t-fc)}{d_t(p_t-fc)}=\text{profit lift.}$$

Figure 4:
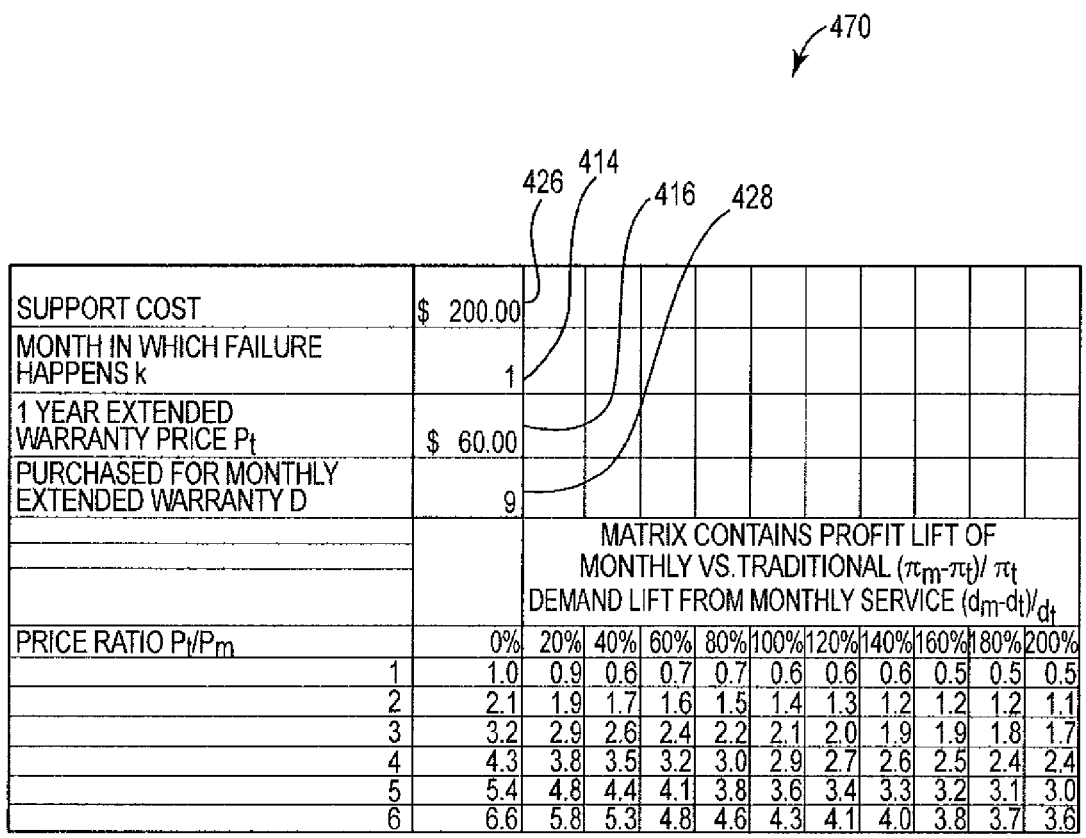
FIG. 4 illustrates a diagram of an example of a tabular presentation for profit comparison according to the present disclosure.

FIG. 4 illustrates a diagram 470 of an example of a tabular presentation for profit comparison according to the present disclosure. Diagram 470 illustrates an example implementation of the present disclosure rather than a limitation thereof, as profit comparison can be used in other implementations. Box 426 can represent the expected one year support cost c from customers who experience at least one failure. Box 428 can include the average duration D (e.g., in months) purchased for monthly flexible duration extended warranty customers who have not experienced failures. Box 414 can include the month k in which a hardware failure occurs. In a provider's worst-case scenario, the hardware fails in the first month (e.g., k=1). Box 416 can include the price $p_t$ of a one year extended warranty (e.g., traditional one year fixed duration extended warranty). Each of these can be values that are determined or provided when estimating the first and second profitabilities.

Each row in diagram 470 can correspond to a different price ratio $p_t/p_m$ assumption, and each column in diagram 470 can correspond to a different demand lift $(d_m-d_t)/d_t$ assumption. A warranty provider can have an estimated profit $\pi_m$ for a flexible duration (e.g., monthly, quarterly, etc.) extended warranty and an estimated profit $\pi_t$ of a fixed duration (e.g., one year, two years, etc.) extended warranty. The warranty provider can quantify the profit lift $(\pi_m-\pi_t)/\pi_t$ of flexible duration (e.g., monthly, quarterly, etc.) extended warranties versus fixed duration (e.g., one year, two years, etc.) extended warranties in different scenarios. Each scenario can be defined by different assumptions in terms of price ratio and demand lift. The profit lift values in FIG. 4 are expressed in terms of a fraction of the fixed duration extended warranty profit.

A warranty provider can choose to pay a premium to an underwriter or other third party rather than paying for individual repairs on hardware failures, and the third party can cover the warranty provider's support costs (e.g., monthly or annually) in part or in total. For example, the third party absorbs the variability in the costs of failures, so this cost can be eliminated, and the third party's premium can be used in its place when determining a profit lift of a flexible duration extended warranty over a fixed duration extended warranty. In this situation, it may be unnecessary to distinguish between customers who do and do not experience failures. When a third party is involved, the variable D can be redefined to be the average duration of coverage of all flexible duration extended warranty customers. The profit lift can be determined from replacing a one year fixed duration extended warranty with a flexible duration monthly extended warranty, and attach lift and average coverage duration of flexible duration extended warranty customers may be considered in the determination.

In comparing estimated profits of flexible and fixed duration warranties, a provider may consider several parameters. A provider's per customer monthly premium $c_m$ paid to the third party for a flexible duration extended warranty can be considered. A provider's per customer premium paid $c_t$ to the underwriter for a one year extended warranty can also be considered, as well as the demands $d_m$ and $d_t$ for flexible duration and fixed duration extended warranties, and their prices $p_m$ and $p_t$. A provider can consider a third party premium impact in response to profit lift or expected flexible warranty coverage durations.

In an example, an underwriter or other third party charges the warranty provider a fixed cost c upfront independent of the demand for the flexible duration and fixed duration extended warranties. A fixed cost leaves the provider with no uncertainty regarding the cost.

The profit $\pi_m$ for a flexible duration or short-term fixed duration extended warranty can be determined using a function. In an example $\pi_m=d_mD(p_m-c_m)$ and can be the expected profit for a flexible duration or short-term fixed duration extended warranty. The profit $\pi_t$ for a fixed duration one year extended warranty can also be determined using a function. In an example, $\pi_t=d_t(p_t-c_t)$ and can be the profit for a fixed duration one year warranty.

The profit lift of a monthly flexible duration extended warranty to a fixed duration warranty (e.g. profit increase as a fraction or percentage of a fixed duration warranty profit) can be determined. For example, $$\frac{d_mD(p_m-c_m)-d_t(p_t-c_t)}{d_t(p_t-c_t)}\times 100\%=$$

profit lift as a fraction of fixed duration warranty profit.

FIG. 5 illustrates a diagram 580 of an example of a tabular presentation for profit comparison according to the present disclosure. Diagram 580 illustrates an example implementation of the present disclosure rather than a limitation thereof, as profit comparison can be used in other implementations. Box 532 can include the provider's per customer premium paid $c_t$ to a third party for a fixed duration one year extended warranty. Box 528 can include the average duration D (e.g., in months) purchased for flexible duration extended warranties. Box 530 can include the provider's per customer premium paid $c_m$ to a third party for a monthly flexible duration extended warranty. Box 516 can include the price $p_t$ of a one year extended warranty (e.g., traditional one year fixed duration extended warranty). These can be values that are determined or provided when estimating the first and second profitabilities.

Each row in diagram 580 can correspond to a different price ratio $p_t/p_m$ assumption, and each column in diagram 580 can correspond to a different demand lift ratio $(d_m-d_t)/d_t$ assumption. A warranty provider can have an estimated profit $\pi_m$ for a flexible duration (e.g., monthly, quarterly, etc.) extended warranty and an estimated profit $\pi_t$ of a fixed duration (e.g., one year, two years, etc.) extended warranty. The warranty provider can quantify the profit lift $(\pi_m-\pi_t)/\pi_t$ of flexible duration (e.g., monthly, quarterly, etc.) extended warranties versus fixed duration (e.g., one year) extended warranties in different scenarios. In FIG. 5, the profit lift is presented as a percentage of fixed duration extended warranty profit. Each scenario can be defined by different assumptions in terms of price and demand lift ratio. Furthermore, infeasible scenarios may be detected and ignored. In an example, a provider can simultaneously view the impact of multiple uncertain parameters and focus on certain parameter combinations that may be the most realistic.

In an example, at box 534, the provider would achieve a 100 percent profit lift (e.g., double their profit) by introducing a flexible duration monthly extended warranty with the following conditions: the monthly price is one-tenth the price of the fixed duration extended warranty, the attach rate is doubled, and the average duration of coverage purchased is nine months. As the price ratio $p_t/p_m$ increases, the demand lift $(d_m-d_t)/d_t$ from flexible duration extended warranties can also increase.

In an example, a scenario can be analyzed to aid in warranty offering decision-making. A provider can analyze profit lift values presented over unfixed parameters (e.g., $p_t/p_m$) and focus on a parameter scenario that can occur. In response to the analysis a provider may or may not provide a flexible duration extended warranty offering.

In another example, a third party may choose a different contract type. For example, the provider may pay a fixed cost C to the underwriter regardless of the demand for the extended warranty, and regardless of which type of warranty is sold. The profit for a flexible duration extended warranty can be $\pi_m=d_mDp_m-C$, and the profit for a fixed 1-year extended warranty can be $\pi_t=d_tDp_t-C$. The expression relating profit lift x to profits for monthly and traditional warranty can be $\pi_m=\pi_t(1+x)$, and profit lift from flexible duration extended warranty to fixed duration (profit increase as a fraction of traditional profit) can be $x=(\pi_m-\pi_t)/\pi_t=[d_mDp_m-d_tp_t]/[d_tp_t-C]$. Other types of contracts may also be considered.

FIG. 6 illustrates a diagram 685 of an example of a tabular presentation for profit comparison according to the present disclosure. Diagram 685 illustrates an example implementation of the present disclosure rather than a limitation thereof, as profit comparison can be used in other implementations. A warranty provider who chooses to pay a premium to an underwriter or other third party can estimate a duration required to achieve a specified profit lift.

In comparing estimated profits of flexible and fixed duration warranties, a provider may consider several parameters. A provider's per customer premium $c_m$ paid to the third party (e.g., monthly premium) for a flexible duration extended warranty can be considered, and a provider's fixed premium C paid to the third party can also be considered. A provider's per customer premium paid $c_t$ to the third party for a fixed duration extended warranty can be considered, as well as the demands $d_m$ and $d_t$ for flexible duration and fixed duration extended warranties, and their prices $p_m$ and $p_t$. A provider can consider a third party premium impact in response to profit lift or expected flexible warranty coverage durations.

In an example, an underwriter or other third party charges the warranty provider a fixed cost C upfront. A fixed cost leaves the provider with no uncertainty regarding the cost. The average duration D* of coverage for all flexible duration extended warranty customers may be considered, as well. Furthermore, the desired level of lift x of flexible duration extended warranty profit relative to fixed duration warranty profit may also be considered. The desired level of lift x can be positive, negative, or zero depending on the requirements of the decision-maker.

The profit $\pi_m$ for a flexible duration or short-term fixed duration extended warranty can be determined using a function. In an example $\pi_m=d_mD(p_m-c_m)$ and can be the expected profit for a flexible duration or short-term fixed duration extended warranty. The profit $\pi_t$ for a fixed duration one year extended warranty can also be determined using a function. In an example, $\pi_t=d_t(p_t-c_t)$ and can be the profit for a fixed duration one year warranty.

The average duration D* to achieve a desired level of profit lift x from fixed duration to flexible duration can be determined. For example, $$D^* = \frac{d_t}{\frac{d_m(1+x)\left(\frac{p_t}{p_m}-\frac{c_t}{c_m}\right)}{1-\frac{c_m}{p_m}}}.$$

In an example, x=0, but profit lift x can equal other values, and a duration can be found that achieves the profit lift x chosen.

Box 632 can include the provider's per customer premium paid $c_t$ to a third party for a fixed duration one year extended warranty. Box 650 can include the desired profit lift x. Box 630 can include the provider's per customer premium paid $c_m$ to a third party for a monthly flexible duration extended warranty. Box 616 can include the price $p_t$ of a one year extended warranty. These can be values that are determined or provided when estimating the first and second profitabilities.

Each row in diagram 685 can correspond to a different price ratio $p_t/p_m$ assumption, and each column in diagram 685 can correspond to a different demand lift ratio $(d_m-d_t)/d_t$ assumption. A warranty provider can have an estimated profit $\pi_m$ for a flexible duration (e.g., monthly, quarterly, etc.) extended warranty and an estimated profit $\pi_t$ of a fixed duration (e.g., one year, two years, etc.) extended warranty. The warranty provider can quantify the profit lift $(\pi_m-\pi_t)/\pi_t$ of flexible duration (e.g., monthly, quarterly, etc.) extended warranties versus fixed duration (e.g., one year) extended warranties in different scenarios. The example diagram 685 contains coverage duration D* required to achieve profit lift x.

In an example, a flexible duration extended warranty is introduced and offered alongside an existing fixed duration extended warranty can be considered. In this case there may be some demand cannibalization: some customers continue to buy the fixed duration warranty, and others may shift to flexible duration. The cannibalization percentage is uncertain to the provider. The cannibalization percentage can be an input parameter considered. In an example, a fraction a of demand for the fixed warranty is "cannibalized" by the introduction of a flexible warranty, and $\alpha d_t$ units of demand for the fixed duration warranty are replaced with $\alpha_m$ units of demand for the flexible duration warranty. The remaining $(1-\alpha)$ portion of demand for the fixed warranty is unchanged. In the case of a third party with a per-service support cost, for example, a profit for monthly extended warranty can be $\pi_m = (1-\alpha)d_t(p_t-c_t)+\alpha d_m D(p_m-c_m)$, and profit for a fixed 1-year extended warranty, can be $\pi_m = d_t(p_t-c_t)$. The expression relating profit lift x to profits for flexible duration extended warranties and fixed duration extended warranties can be $\pi_m = \pi_y \cdot (1+x)$, and profit lift from flexible to fixed (profit increase as a fraction of traditional profit) can be $x=(\pi_m-\pi_t)/\pi_t=\alpha[d_m D (p_m-c_m)-d_t(p_t-c_t)]/[d_t(p_t-c_t)]$.

The cannibalization factor α is another uncertain parameter and thus the provider may want to examine profit impact or duration required for profit lift target under several scenarios for α and other parameters.

Figure 7:
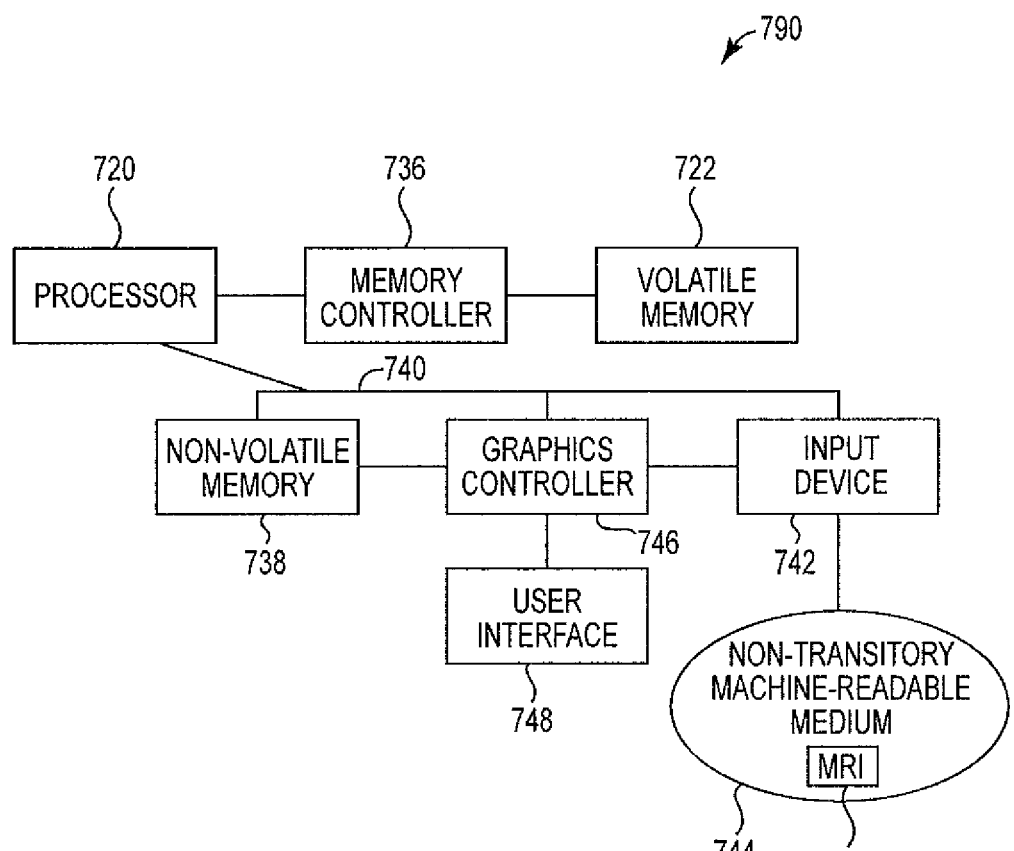
FIG. 7 illustrates a block diagram of an example of a computing system for profit comparison according to the present disclosure.

FIG. 7 illustrates a block diagram of an example of a computing system 790 for profit comparison according to the present disclosure. However, examples of the present disclosure are not limited to a particular computing system configuration. The system 790 can include processor resources 720 and memory resources (e.g., volatile memory 722 and/or non-volatile memory 738) for executing instructions stored in a tangible non-transitory medium (e.g., volatile memory 722, non-volatile memory 738, and/or machine-readable medium 744) and/or an application specific integrated circuit (ASIC) including logic configured to perform various examples of the present disclosure. A computer (e.g., a computing device) can include and/or receive a tangible non-transitory machine-readable medium 744 storing a set of machine-readable instructions (e.g., software) via an input device 742. As used herein, processor resources 720 can include one or a plurality of processors such as in a parallel processing system. Memory resources can include memory addressable by the processor resources 720 for execution of machine-readable instructions. The machine-readable medium 744 can include volatile and/or non-volatile memory such as random access memory (RAM), magnetic memory such as a hard disk, floppy disk, and/or tape memory, a solid state drive (SSD), flash memory, phase change memory, etc. In some examples, the non-volatile memory 738 can be a database including a plurality of physical non-volatile memory devices. In various examples, the database can be local to a particular system or remote (e.g., including a plurality of non-volatile memory devices 738). A computing device having processor resources can be in communication with, and/or receive a tangible non-transitory machine-readable medium (MRM) 720 storing a set of machine-readable instructions 724 (e.g., software) for profit comparison, as described herein.

The processor resources 720 can control the overall operation of the system 790. The processor resources 720 can be connected to a memory controller 736, which can read and/or write data from and/or to volatile memory 722 (e.g., RAM). The memory controller 736 can include an ASIC and/or a processor with its own memory resources (e.g., volatile and/or non-volatile memory). The volatile memory 722 can include one or a plurality of memory modules (e.g., chips).

The processor resources 720 can be connected to a bus 740 to provide for communication between the processor resources 720, and other portions of the system 790. The non-volatile memory 738 can provide persistent data storage for the system 790. The graphics controller 746 can connect to a user interface 748, which can provide an image to a user based on activities performed by the system 790.

Each system can include a computing device including control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute machine-readable instructions that are stored on a non-transitory machine-readable medium (e.g. non-transitory machine-readable medium 744). The non-transitory machine-readable medium can be integral, or communicatively coupled, to a computing device, in either in a wired or wireless manner. For example, the non-transitory machine-readable medium 744 can be an internal memory, a portable memory, a portable disk, or a memory located internal to another computing resource (e.g., enabling the machine-readable instructions to be downloaded over the Internet). The non-transitory machine-readable medium 744 can have machine-readable instructions 724 stored thereon that are executed by the control circuitry (e.g., processor) to provide a particular functionality.

The non-transitory machine-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory machine-readable medium can include optical discs, digital video discs (DVD), Blu-Ray Discs, compact discs (CD), laser discs, and magnetic media such as tape drives, floppy discs, and hard drives, solid state media such as flash memory, EEPROM, phase change random access memory (PCRAM), as well as other types of machine-readable media.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A computer-implemented method for profit comparison comprising:
   determining, via a computer, a first expected profitability of a flexible duration extended warranty offering based on a first plurality of warranty parameters including a demand for the flexible duration extended warranty offering, a probability of failure of hardware associated with the flexible duration extended warranty offering, and a price of the flexible duration extended warranty offering;
   determining, via the computer, a second expected profitability of a fixed duration extended warranty offering based on a a second plurality of warranty parameters including a demand for the fixed duration extended warranty offering, a price of the fixed duration extended warranty offering, and a probability of failure of hardware associated with the fixed duration extended warranty offering;
   comparing, via the computer, the first expected profitability and the second expected profitability to determine a profit lift of the flexible duration extended warranty offering over the fixed duration extended warranty offering; and presenting results of the comparison, via the computer, for a plurality of values of the first and second plurality of warranty parameters.

2. The method of claim 1 wherein profit lift is a function of the first profitability and the second profitability such that the first profitability $\pi_m$ is equal to the second profitability $\pi_f$ multiplied by the sum of the profit lift x and one, such that $\pi_m = \pi_f(1+x)$.

3. The method of claim 1 further comprising fixing a first portion of the first and second plurality of warranty parameters, and determining an average flexible duration warranty offering coverage duration as a function of a second portion of the first and second plurality of warranty parameters.

4. The method of claim 1 further comprising fixing a first portion of the first and second plurality of warranty parameters and determining the profit lift as a function of a second portion of the first and second plurality of warranty parameters.

5. The method of claim 1 further comprising fixing a first portion of the first and second plurality of warranty parameters and determining a parameter of interest of the first plurality of warranty parameters as a function of a second portion of the first and second plurality of warranty parameters.

6. The method of claim 1 further comprising determining whether to offer a customer the flexible duration extended warranty offering based on the presented results.

7. The method of claim 1 wherein the flexible extended warranty offering includes at least one of an extended warranty that is billed upfront and can be canceled at any time with a pro-rated refund and an extended warranty that can be purchased and paid for on a periodic basis.

8. The method of claim 1, wherein presenting the results of the comparison includes presenting the results in tabular form, the tabular form including a comparison of a rice ratio and a demand ratio wherein the price ratio includes a ratio of the price for the fixed duration extended warranty offering to the price for the flexible extended warranty offering and wherein the demand ratio includes a ratio of the demand for the fixed duration extended warranty offering to the demand for the flexible extended warranty offering.

9. A non-transitory machine-readable medium storing a set of instructions for profit comparison executable by the computer to cause the computer to:
   determine an expected profit of a flexible duration extended warranty offering based on a first plurality of warranty parameters including a demand for the flexible duration extended warranty offering, a price of the flexible duration extended warranty offering, and a probability of failure of hardware associated with the flexible duration extended warranty offering;
   determine an expected profit of a fixed duration extended warranty offering based on a second plurality of warranty parameters including a demand for the fixed duration extended warranty offering, a price of the fixed duration extended warranty offering, and a probability of failure of hardware associated with the fixed duration extended warranty offering
   determine an average coverage duration of a flexible duration extended warranty customer for which the expected profit of the flexible duration extended warranty offering equals a predetermined profit lift level over the expected profit of the fixed duration warranty offering as a function of the first and second plurality of warranty parameters;
   fix values of a first portion of the first and second plurality of parameters; and
   present results of the average coverage duration determination for a plurality of values of a second portion of the first and second plurality of parameters.

10. The machine-readable non-transitory medium of claim 9 wherein the instructions to determine an average coverage duration include instructions to determine the average coverage duration for the flexible duration extended warranty customer for which the expected profit of the flexible duration extended warranty offering equals the expected profit of the fixed duration warranty offering as a function of the first and second plurality of warranty parameters.

11. The machine-readable non-transitory medium of claim 9 wherein the first plurality of warranty parameters further includes at least one of, a month of hardware failure, a hardware repair cost, a third party premium for the flexible duration warranty offering, an average duration of coverage for the customer who does not experience hardware failure, and an average duration of coverage for all flexible duration warranty offering customers.

12. The machine-readable non-transitory medium of claim 9 wherein the second plurality of warranty parameters further includes at least one of a hardware repair cost and a third party premium for the fixed duration warranty offering.

13. A system for profit comparison, comprising:
   a computing device including:
      a memory;
      a processor coupled to the memory, to:
         determine an expected profit lift of a flexible duration extended warranty offering over a fixed duration warranty offering based on a first plurality of parameters including a demand for the flexible duration extended warranty offering, a price of the flexible duration extended warranty offering, and a probability of failure of hardware associated with the flexible duration extended warranty offering;
         fix values of a first portion of the first plurality of parameters;
         present results of the determination for a plurality of values of a second portion of the first plurality of parameters.

14. The system of claim 13 wherein the processor coupled to the memory further determines an expected profit of the flexible duration extended warranty offering as a function of at least one of a hardware failure month, a hardware repair cost, a third party premium for the flexible duration extended warranty, an average duration of coverage for a customer who does not experience the hardware failure, and an average duration of coverage for all flexible duration warranty offering customers.

15. The system of claim 13 wherein the processor coupled to the memory further determines an expected profit of the fixed duration extended warranty offering as a function of at least one of a third party premium for the fixed duration extended warranty offering and a hardware repair cost.

* * * * *

UNITED STATES PATENT AND TRADEMARK OFFICE
CERTIFICATE OF CORRECTION

PATENT NO. : 8,478,620 B2  
APPLICATION NO. : 13/027942  
DATED : July 2, 2013  
INVENTOR(S) : Julie Ward Drew et al.

Page 1 of 1

It is certified that error appears in the above-identified patent and that said Letters Patent is hereby corrected as shown below:

In the Claims

In column 14, line 57, in Claim 1, after "on" delete "a a" and insert -- a --, therefor.

In column 15, line 35, in Claim 8, delete "rice" and insert -- price --, therefor.

In column 15, line 36, in Claim 8, after "demand" delete "ratio" and insert -- ratio, --, therefor.

In column 15, line 58, in Claim 9, after "offering" insert -- ; --.

Signed and Sealed this  
Twenty-fourth Day of September, 2013

Teresa Stanek Rea  
*Deputy Director of the United States Patent and Trademark Office*